United States Patent [19]

King

[11] Patent Number: 5,002,620

[45] Date of Patent: Mar. 26, 1991

[54] METHOD OF PRODUCTION OF FIBER-REINFORCED CELLULAR CONCRETE

[75] Inventor: John B. King, Winston-Salem, N.C.

[73] Assignee: Pace Technologies, Inc., Winston-Salem, N.C.

[21] Appl. No.: 315,138

[22] Filed: Feb. 24, 1989

[51] Int. Cl.[5] .......... B29C 65/00

[52] U.S. Cl. .......... 156/153; 156/264

[58] Field of Search .......... 156/62.6, 153, 264; 52/309.12, 309.17, DIG. 7; 428/70, 71, 312.4, 703; 264/42

[56] References Cited

U.S. PATENT DOCUMENTS

| | | | |
|---|---|---|---|
| 2,152,190 | 3/1939 | Henderson | 264/42 |
| 2,522,116 | 9/1950 | Hayes | 264/42 |
| 2,805,448 | 9/1957 | Rubenstein | 52/309.17 |
| 3,395,204 | 7/1968 | Olsson et al. | 264/157 |
| 3,565,650 | 2/1971 | Cordon | 106/97 |
| 3,595,947 | 7/1971 | Wielinga et al. | 428/312.4 |
| 3,764,357 | 10/1973 | Bowles et al. | 264/122 |
| 3,809,595 | 5/1974 | Nichols et al. | 52/DIG. 7 |
| 4,113,913 | 9/1978 | Smiley | 428/312.4 |
| 4,292,364 | 9/1981 | Wesch et al. | 52/309.17 |
| 4,357,289 | 11/1982 | Jakobsson | 428/703 |
| 4,379,870 | 4/1983 | Matsumoto | 428/703 |

FOREIGN PATENT DOCUMENTS

| | | | |
|---|---|---|---|
| 0499098 | 1/1954 | Canada . | |
| 0038892 | 12/1975 | Japan | 52/309.17 |

OTHER PUBLICATIONS

Short, Andrew and Kinniburgh, William, *Lightweight Concrete,* John Wiley & Sons, Inc., 1963, pp. 222–239.

*Primary Examiner*—Michael W. Ball
*Assistant Examiner*—Steven D. Maki
*Attorney, Agent, or Firm*—Thomas & Kerr

[57] ABSTRACT

A fiber-reinforced cellular concrete is disclosed along with methods of production of the concrete material and of building materials formed from the concrete. The invention includes diverse fractions of concrete, a relatively dense, waterproofed fraction and a lightweight fraction having essentially the same composition but with gas bubbles dispersed therethrough. A composite product is formed from the casting of the lighter fraction over the heavier fraction to form a single sheet, with the lighter fractions of separate sheets being planed and bonded together with a vapor barrier therebetween to form blocks, wall panels, beams, and the like.

4 Claims, 2 Drawing Sheets

METHOD OF PRODUCTION OF FIBER-REINFORCED CELLULAR CONCRETE

BACKGROUND OF THE INVENTION

While the realm of building materials for houses, office buildings, and other structures includes brick, concrete, steel, wood and others, in general, the major components used, especially in housing, continue to be concrete and wood. A majority of houses constructed and being constructed are composed of poured or block concrete foundations with wood framing used to construct the house.

One problem with this approach is the rising costs associated with the materials as well as with the labor required for constructing a typical wood frame structure. Timber production especially is becoming more expensive when factoring in production costs, transportation, and the supply of wood, which, while a replenishable resource, takes many years to produce. Thus, many individuals are priced out of the housing market simply on the basis of material costs.

Conventional concrete construction is also expensive in terms of materials and labor costs. Poured concrete construction requires extensive form construction, normally requires that a concrete mixing truck be on site, and is relatively time-consuming, all of which escalate the costs involved. Construction with concrete blocks has similar disadvantages in terms of material delivery and the costs of setting the blocks. These problems are compounded by the extreme weight of the concrete or concrete product. Thus, a need exists in the art for a substitute medium which avoids the disadvantages of the prior art products and methods while retaining the inherent advantages.

SUMMARY OF THE INVENTION

It is, therefore, one of the principal objects of the present invention to provide a fiber-reinforced, cellular concrete product which can be made much lighter than conventional poured concrete or concrete blocks, but which retains the advantages of concrete with regard to strength, durability, and relative ease of manufacture among others.

Another object of the present invention is to provide a lightweight concrete medium that can be quickly and easily prepared on-site and which can be easily molded or cut for specific applications.

A further object of the present invention is to provide a lightweight concrete product which can be supplemented with an integral vapor barrier, reinforcing agents, and/or an outer protective or decorative material, any or all of which can be integrated into the manufacturing process of the present concrete invention.

A still further object of the present invention is to provide a method by which the present invention may be manufactured and in which additional steps in the manufacturing process may be added for specialized applications of the product.

These and additional objects are attained by the present fiber-reinforced cellular concrete and method for manufacturing same. The concrete is comprised of materials selected from the group including: Portland cement, suitable aggregates, a fibrous reinforcing material, ash from refuse-derived fuel, expanded silicate, water, sand, a suitable foaming agent and a source of compressed gas, used in combination to introduce bubbles into the mix, and a suitable vapor barrier/resin for use in bonding and moisture resistance. The method contemplated by the present invention involves the fabrication of two basic products, a layered product having concrete materials of different densities laminated together, and a homogeneous product which may be molded into a desired configuration or formed as a cube which is then cut to a desired size, shape, etc.

Various other objects and advantages of the present invention will become apparent from the following description, with reference to the accompanying drawings.

DETAILED DESCRIPTION OF THE PREFERRED EMBODIMENT

Figure 1:
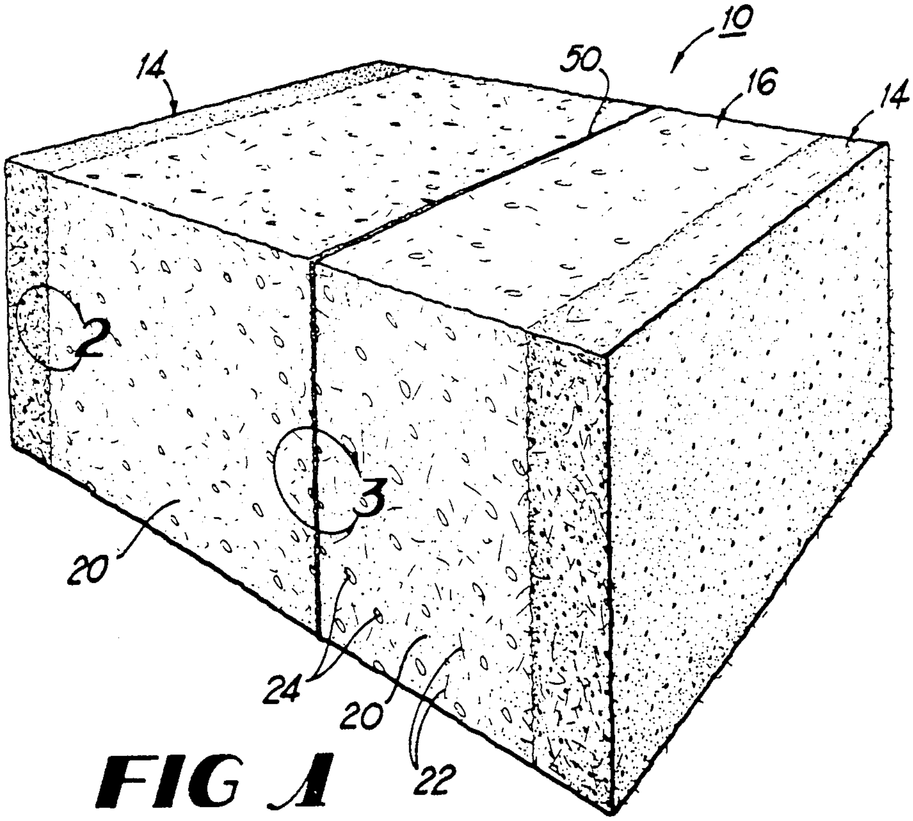
FIG. 1 is a perspective view of a lightweight, fiber-reinforced concrete block, formed in accordance with the present inventive method.

Referring now more specifically to the drawings, and to FIG. 1 in particular, numeral 10 designates generally a lightweight, fiber-reinforced, concrete block. The block is shown to illustrate a particular use of the present invention but is not meant to limit the use of the material in any way. It is understood that a plurality of products can be produced using the material of the present invention, depending on the use to which the invention is put and the particular form of the material used in making the products. Since the present material is fluid prior to curing, various molds and mold forms may be used in producing the various end products.

The invention, in its broadest sense, is a fiber-reinforced cellular concrete that exhibits virtually all of the beneficial properties of a typical concrete material, but with greatly increased strength and reduced weight in the gas-entrained embodiment. The weight reduction is accomplished by the entrainment of gas bubbles in the fluid concrete mixture prior to its hardening. For purposes of this invention, nitrogen gas has been found to be a preferred agent; however, other gases may also be used.

Figure 7:
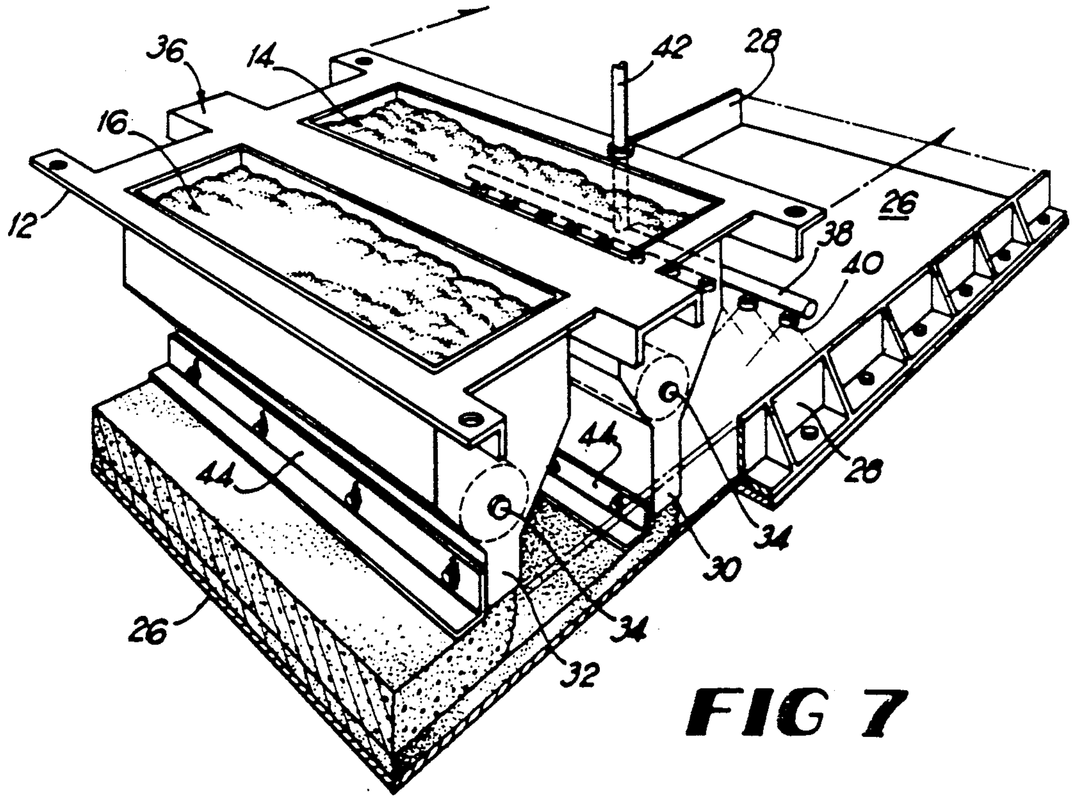
FIG. 7 is a partial, perspective view illustrating one method of forming the block product shown in FIGS. 1–3.

Returning to the drawings, as noted, numeral 10 designates a concrete block formed with the present concrete material. The block 10 is normally formed in a molding operation such as, for example, the operation shown in FIG. 7, the apparatus 12 for which has also been developed by the present applicant and forms a part of the present invention.

The block 10 includes normal weight concrete fractions 14 on each side thereof as shown in FIG. 1. Bonded to the fractions 14 are lightweight fractions 16. The concrete mixture itself in the normal and lightweight fractions is essentially the same, the difference in the two coming from the entrainment of gas in the lightweight fractions. Thus, the entrained gas, in the form of bubbles in the fluid mixture, occupies a significant amount of space while concomitantly reducing the weight. The outer or normal weight fractions 14 have a typical gas or air content of approximately two percent (2%) while the lightweight portions have approximately twenty-five to forty percent (25%–40%) gas entrained therein. The weight reduction is significant. Normal weight concrete ranges from 130 to 140 pounds per cubic foot, while the lightweight material ranges from 26 to 80 pounds per cubic foot, thus realizing a 30% or greater reduction in weight.

As an example of the quantities of the components required for one cubic yard of the present concrete mixture, 5.4 cubic feet of Portland cement, 10.8 cubic feet of aggregate, and 10 cubic feet of ash or expanded silicate or ash and expanded silicate are combined to produce 1 cubic yard of concrete. Added to this mixture are polypropylene fibers, carbon fibers, or other suitable fibrous material and an admix, which may be a suitable waterproofing, air entraining, and reduction polymeric agent in the heavier fraction 14 and a foaming agent which, after gas entrainment, is mixed into the lighter weight fraction 16. A suitable polymeric agent is available from BIKA Building & Chemical Systems, Inc. of Winston-Salem, N.C. under the trade name "BIKA BOND", the polymeric agent also providing a degree of flexibility. A suitable foaming agent is available from the same company, one type being a synthetic agricultural foaming agent. Nitrogen has been found to be a preferred gas to be introduced into the foaming agent as it exhibits very little migration upwardly through the concrete mix when introduced therein.

Figure 2:
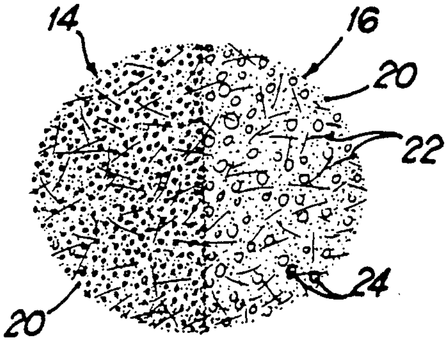
FIG. 2 is an enlarged, partial, side elevational view illustrating concrete of different densities bonded together, the view being taken from circle 2 in FIG. 1.
Figure 3:
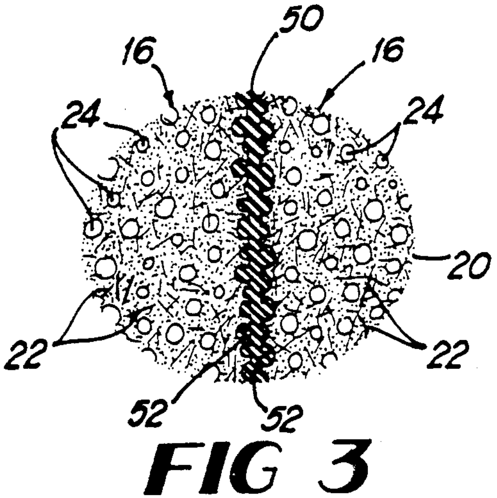
FIG. 3 is an enlarged, partial, side elevational view illustrating a vapor barrier disposed between concrete portions of equal density, the view being taken from circle 3 in FIG. 1.
Figure 3A:
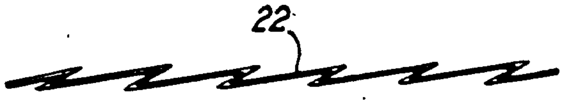
FIG. 3A is a perspective view of a type of indented fiber which may be used in the present invention.

The components are illustrated in FIG. 1–3 where one of the possible finished products is shown, particularly in FIGS. 2 and 3. As noted hereinabove, the present concrete includes aggregate 20, fibers 22 which are preferably, indented, notched, knotted, etc., and gas bubbles 24 in the lightweight fraction 16. The indentations or notches in the fibers 22 engage and hold on to other fibers in the concrete, thereby facilitating the bonding of the concrete, one type being shown in FIG. 3A. The block shown in FIG. 1 is cast in separate right and left halves, in an apparatus as is partially illustrated in FIG. 7. A mold tray 26, mounted on a suitable frame (not shown), receives the diverse fractions 14 and 16 of concrete. The tray is provided with removable side walls 28 to contain the concrete. The concrete mixes are dispensed sequentially from twin hoppers 30 and 32 which contain the heavier and lighter fractions, respectively, aided by variable speed augers 34.

The hoppers are movably supported in a conventional manner by a frame 36 which is mounted on tracks located on the mold table, the direction of travel being shown by the arrow.

Preceding the hoppers is a manifold 38 which dispenses a suitable mold release agent through nozzles 40, the release agent being supplied through conduit 42. The hoppers are vertically adjustable and include doctor blades 44 mounted on the trailing edges thereof to smooth the concrete into sheets of any desired length and height. Suitable vibration means (not shown) are also supplied beneath the mold table which receives the concrete to vibrate and settle the concrete.

Referring again to FIGS. 1–3, FIG. 2 illustrates the interface between the heavier and lighter fractions. Since the fractions are essentially the same composition, they may be simultaneously casted and thus cure together into an integral product. The bonding is facilitated by the fibers 22 at the interface, which extend between the different fractions.

The finished sheets of concrete are cured and the upper exposed surface of the lighter fractions 16 are then planed, such as with a carborundum drum, and then vacuumed. The planing smooths the concrete and exposes portions of the gas bubbles 24 at the surface thereof. The sheets are then cut to a desired length and the lightweight fractions 16 from opposed sheets are bonded together in sandwich form to form block 10.

A suitable resin 50, or like material, is disposed between the opposed lightweight fractions, and, in filling the opened gas bubbles at the interface, creates a series of ball and socket joints throughout the interface. The resin also serves as an integral vapor barrier which extends throughout the block and a chemical bond between the mated surfaces. The position of the vapor barrier is adjustable and may be located anywhere in the lightweight fraction by varying the heights of the lightweight fractions. For example, where more insulation is desired on the inside of a structure built with blocks 10, the position of the vapor barrier can be adjusted outwardly by mating sheets of varying thickness and setting the thicker portion toward the inside. Thus, blocks having the same overall dimensions, can provide insulating qualities which are easily varied by region or even by specific applications, while still providing a standard size. It must also be noted, that while the description has focused on the concrete block shown in FIG. 1, the product formed by the just described method can be of any desired thickness and any desired size, to form, for example, wall panels or laminated concrete beams.

The heavier fraction 14, which includes the waterproofing polymeric agent, achieves a crushing strength of 2000–6000 pounds per square foot. Thus, the integrity of the block or panel is maintained by the opposing heavier fractions 14, while the lightweight fractions 16 and the vapor barrier/bonding means 50 provide superior insulating qualities.

Figure 4:
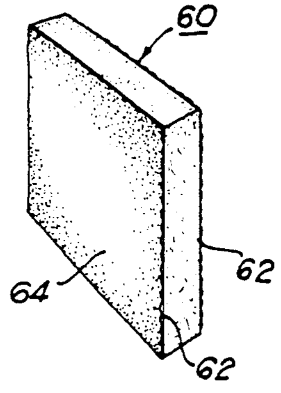
FIG. 4 is a perspective view of a lightweight concrete board formed according to the present invention.
Figure 5:
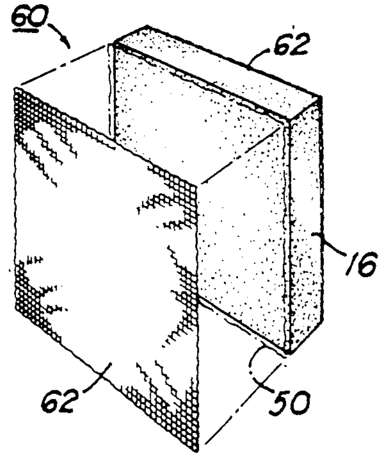
FIG. 5 is an exploded perspective view illustrating the application of an outer covering for the concrete board product.
Figure 6:
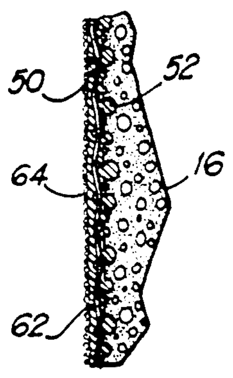
FIG. 6 is a partial, cross-sectional view, illustrating in detail the surface of the concrete board and applied covering.

Another application of the present invention is shown in FIGS. 4 through 6, illustrating wall panels 60 formed from the lightweight fraction 16. Concrete, mixed as described hereinabove with gas bubbles entrained therein, is cast into a convenient size, such as 8 ft.×8 ft.×4 ft. cubes. The cubes are then sawn into a desired thickness and planed to smooth the surface and expose portions of the gas bubbles. Resin 50 is then applied to the planed surface and a fibrous mat 62 such as a carbon-fiber mat is applied thereover in, for example, a hot-melt operation. The mat is thus impregnated with the resin and becomes firmly bonded to the concrete 14 through the holding power of the resin in the ball and socket joints 52. A decorative, acoustical, or other desired finish 64 may then be applied to the exterior surfaces of the panels, prior to hardening of the resin. Panels formed in this manner with a finish already in place, may be applied to stud walls in building construction. The concrete panels do not require finishing and are lighter and less expensive than conventional drywall products. All other known panels have cold bridges, i.e., rebar, spikes, etc. Concrete panels formed according to the present invention are void of such cold bridges due to their homogeneous composition and the inherent strength of the material which obviates the need for reinforcement.

The present material is capable of many other uses and those described herein will be understood to be but examples of such uses. The utilization of ash from refuse-derived fuel alleviates a disposal problem, while, at the same time, encouraging recovery of waste products for ash production. The invention may also be easily and beneficially substituted for wood products in many applications, thus conserving the limited supply of trees.

A further beneficial use of the present invention is its use as a core material which is then encapsulated in, for example high-strength resins in combination with carbon fibers. The encapsulated core material may then be laminated into beams, columns and other materials particularly for wide-span applications, where timber laminates or steel lattice have been the only available materials. The laminated beams may be any desired configuration or dimension to achieve these ends and exhibit greater strength than steel or timber with greatly reduced dead load characteristics. The use of the present material as a core material is partially illustrated in FIG. 6. Blocks of the lightweight fraction 16 are formed and cut to a desired size and configuration. All exposed faces are then planed to smooth the faces and expose portions of the gas bubbles entrained therein. A high-strength resin 50 is then applied to the exposed surfaces and the concrete is then encapsulated in a mat 62, again preferably a high-strength carbon fiber, in a hot melt operation. Prior to the curing of the resin, the encapsulated members are laminated into a desired configuration.

While an embodiment of a fiber-reinforced concrete and a method of producing same and modifications thereof have been shown and described in detail herein, various additional changes and modifications may be made without departing from the scope of the present invention.

I claim:

1. A method of forming a concrete building material which includes at least two separate and substantially identical sheet members of concrete secured against one another in sandwich form, comprising the steps of:

(a) forming a first layer of relatively dense concrete having fibers mixed therethrough;

(b) forming a second layer of a relatively lightweight concrete over said first layer prior to curing of said first layer, said second layer also including fibers mixed therethrough, said fibers in said first and second layers becoming intermingled at the interface of said layers, and said second layer including gas bubbles dispersed therethrough;

(c) allowing said concrete layers to cure into sheet form and cutting said sheets to a desired length for forming distinct concrete sheet members;

(d) planing the outer surface of said second layer of two substantially identical concrete sheet members for smoothing the outer surface thereof and opening said gas bubbles disposed near said outer surface;

(e) applying a resinous means to the planed surfaces of said second layer; and (f) disposing one of said separate and substantially identical sheet members of concrete over said resinous means, mating opposed and planed second layers and forcing said resinous material into said open gas bubbles for creating ball and socket joints between said separate and substantially identical sheet members, said resinous material also forming a vapor barrier between said mated sheet members.

2. The method of claim 1 wherein said fiber-reinforced cellular concrete as defined in claim 1 includes elemental nitrogen as the gas.

3. The method of claim 2 wherein said fibers comprise a plurality of indented fibers selected from the group consisting of polypropylene and carbon fibers.

4. The method of claim 1 wherein said fibers comprise a plurality of indented fibers selected from the group consisting of polypropylene and carbon fibers.

* * * * *